United States Patent
Ouedraogo et al.

(10) Patent No.: US 9,344,697 B2
(45) Date of Patent: May 17, 2016

(54) METHOD AND DEVICE FOR TRANSITIONING BETWEEN AN IMAGE OF A FIRST VIDEO SEQUENCE AND AN IMAGE OF A SECOND VIDEO SEQUENCE

(71) Applicant: CANON KABUSHIKI KAISHA, Tokyo (JP)

(72) Inventors: Naël Ouedraogo, Maure de Bretagne (FR); Franck Denoual, Saint Domineuc (FR); Fabrice Le Leannec, Mouaze (FR)

(73) Assignee: Canon Kabushiki Kaisha, Tokyo (JP)

(*) Notice: Subject to any disclaimer, the term of this patent is extended or adjusted under 35 U.S.C. 154(b) by 286 days.

(21) Appl. No.: 13/759,868

(22) Filed: Feb. 5, 2013

(65) Prior Publication Data

US 2013/0202273 A1     Aug. 8, 2013

(30) Foreign Application Priority Data

Feb. 7, 2012   (GB) .................................. 1202082.2

(51) Int. Cl.
*G11B 27/00*   (2006.01)
*H04N 9/79*    (2006.01)
*H04N 5/445*   (2011.01)
*H04N 5/76*    (2006.01)
*H04N 9/82*    (2006.01)
(Continued)

(52) U.S. Cl.
CPC ................. *H04N 9/79* (2013.01); *H04N 5/445* (2013.01); *H04N 5/76* (2013.01); *H04N 9/8205* (2013.01); *H04N 21/44016* (2013.01); *H04N 21/440263* (2013.01); *H04N 21/4728* (2013.01); *H04N 21/6581* (2013.01); *H04N 5/765* (2013.01)

(58) Field of Classification Search
CPC ......... H04N 7/147; H04N 5/445; H04N 5/76; H04N 5/765; H04N 9/8205; H04N 21/44016; H04N 21/440263; H04N 21/4728; H04N 21/6581; G01B 11/22
USPC .......... 386/278, 280; 348/14.08, 135; 382/205
See application file for complete search history.

(56) References Cited

U.S. PATENT DOCUMENTS

| | | | |
|---|---|---|---|
| 5,353,391 A | 10/1994 | Cohen et al. | |
| 8,478,050 B2* | 7/2013 | Oami et al. | 382/205 |
| 2008/0297588 A1* | 12/2008 | Kurtz et al. | 348/14.08 |

(Continued)

FOREIGN PATENT DOCUMENTS

GB          2435141 A       8/2007

*Primary Examiner* — Thai Tran
*Assistant Examiner* — Mishawn Hunter
(74) *Attorney, Agent, or Firm* — Canon U.S.A., Inc. IP Division

(57) ABSTRACT

A method for transitioning between an image of a first video sequence and an image of a second video sequence, wherein an image of the video sequences corresponds to one sub-region of a respective image of the other video sequence, receiving one image from the first video sequence; providing, from the one image, one pre-transition image; for each one pre-transition image: determining a confidence region within the one pre-transition image based on a set of confidence values, each confidence value representing, for a respective block of the one pre-transition image, the level of reliability of determining one or more blocks of a corresponding image in the second video sequence; computing a transition image corresponding to the second video sequence, the transition image being a function of the determined confidence region of the pre-transition image; and displaying the transition image for a duration upon the reception of the second video sequence.

45 Claims, 7 Drawing Sheets

(51) Int. Cl.
*H04N 21/44* (2011.01)
*H04N 21/4402* (2011.01)
*H04N 21/4728* (2011.01)
*H04N 21/658* (2011.01)
*H04N 5/765* (2006.01)

(56) References Cited

U.S. PATENT DOCUMENTS

2008/0316307 A1 * 12/2008 Petersohn .................... 348/135
2012/0016965 A1    1/2012 Chen et al.

* cited by examiner

METHOD AND DEVICE FOR TRANSITIONING BETWEEN AN IMAGE OF A FIRST VIDEO SEQUENCE AND AN IMAGE OF A SECOND VIDEO SEQUENCE

This application claims priority from GB patent application number 1202082.2 of Feb. 7, 2012, which is incorporated by reference herein in its entirety.

BACKGROUND

The present invention concerns a method and a device for transitioning between an image of a first video sequence and an image of a second video sequence. The invention further relates to a method and device for transmitting video sequences.

Embodiments of the present invention may be applied in the context of remote browsing of video sequences by a client via of a network such as the Internet. Some video data provider systems provide video data of video sequences with region of interest (ROI) functionalities. Such systems typically comprise a video server associated with a database of correlated video sequences. One such video sequence may comprise an overview video sequence with clickable subparts (ROIs). Other video sequences in the database may correspond to one or more regions of interest of the first video sequence in a higher resolution, for example, also referred to as zoomed versions. Such videos sequences are often referred to as ROI videos. The video server provides the different video sequences with metadata that may be used to access the regions of interest at the client side.

The regions of interest may be predetermined, for instance, by the user or by an administrator of the video sequence database. In some cases the regions of interest move within the overview video sequence to follow moving objects of a recorded scene. A client receiving the data can superimpose regions of interest over the display of the overview video sequence. When the user selects one of the regions of interest, the client sends a request to obtain the corresponding ROI video sequence. Media Fragment URI for example may be employed to retrieve the ROI video sequence from the current time of the overview video sequence. The server stops the streaming of the overview video sequence and starts sending the requested ROI video from the requested start time.

On the client side, the browser switches from playing the overview video sequence to playing the ROI video sequence once it has received the ROI video sequence by performing a transition (typically a zoom-in transition). Then, in response to a second user click, the client can send a request to the server to request a media fragment of the overview video sequence from the current time to the end of the file or video sequence. The server then stops the transmission of the ROI video and starts streaming of the overview video sequence. The browser performs a transition (typically a zoom-out transition) once the overview video data is received.

Due to latency in transmission, the availability of video data is not guaranteed immediately after the client has requested it. The transition between the two video sequences cannot be performed immediately since video data of the second video sequence is not received instantaneously after the client's request. Traditionally it was necessary to wait for video data of the second video sequence to be received before performing the transition. The main disadvantage of such a method is that when the transmission delay is close to or even exceeds one second, the transition does not occur as soon as the user requests it.

SUMMARY

The present invention has been devised to address one or more of the foregoing concerns.

According to a first aspect of the invention there is provided a method of transitioning between an image of a first video sequence and an image of a second video sequence, wherein an image of the one of the video sequences corresponds to at least one sub-region of a respective image of the other video sequence, the method comprising receiving at least one image from the first video sequence; providing, from the at least one image, at least one pre-transition image; for each at least one pre-transition image: determining a confidence region within the at least one pre-transition image based on a set of confidence values, each confidence value representing, for a respective block of the at least one pre-transition image, the level of reliability of determining one or more blocks of a corresponding image in the second video sequence from said respective block; computing a transition image corresponding to the second video sequence, the transition image being a function of the determined confidence region of the pre-transition image; and displaying the transition image during transitioning between the first video sequence and the second video sequence for a time duration dependent on the number of images of the second video sequence received.

The confidence region provides more reliable data for display while performing the transition between two video sequences leading to a smoother visual transition between the video sequences.

In an embodiment the transition image is displayed during transitioning between the first video sequence and the second video sequence for a time duration dependent on the time for receiving a predetermined number of images of the second video sequence.

By virtue of this feature, the display is not stopped nor frozen during the transition between the first and the second video sequence.

The term pre-transition image relates to an initial image from which the transition image is provided. It may be a stored image or a previously derived pre-transition image or transition image. The transition image is derived from the pre-transition image based on confidence values associated with the pre-transition image. The term transition image corresponds to an image to be displayed during transition between video sequences In one embodiment of the invention an image of the second video sequence corresponds to a sub-region of a respective image of the first video sequence, and wherein for a transition from the first video sequence to the second video sequence, the at least one pre-transition image provided is the last received image of the first video sequence. In one example, for a transition from the first video sequence to the second video sequence, computing the transition image comprises a step of progressively up-sampling pixels of the sub-region.

This feature allows a smoother transition when zooming in from a sub-region of a video to the full video.

In another embodiment an image of the first video sequence corresponds to a sub-region of a respective image of the second video sequence, and wherein for a transition from the first video sequence to the second video sequence, providing the at least one pre-transition image comprises the steps of:

providing an image having a size based on the size of an image of the second video sequence;

generating a zone of pixels corresponding to the sub-region of the second video sequence by down sampling the pixels of a received image of the first video sequence, based on the size of the sub-region; and adding the zone of generated pixels to a region of the said provided image corresponding to the sub-region in the respective image of the second video sequence.

In an example, computing the transition image comprises the step of progressively down-sampling pixels of an image of the first video sequence to provide the transition image corresponding to the sub-region.

As a consequence, at least the sub-region of the respective image of the second video sequence contains recent video data.

In one embodiment, the provided image is a previously received image of the first video sequence. In another embodiment the provided image is a pre-transition image previously provided.

Using pre-transition images allows a smoother transition to be obtained than when using a previously received image, which could have been received well before the current transition.

In an embodiment, parameters defining the or each sub-region within images of the first video sequence are received in metadata in the form of a coded XML representation.

These parameters allow the sub-regions to be accessed directly.

In an embodiment, a respective set of confidence values is defined for each sub-region, each sub-region having an associated second or further video sequence.

These confidence values allow areas of the sub-regions to be classified based on their capability to provide valuable information for performing the transition.

In an embodiment, the set of confidence values is received in the form of metadata.

As a consequence, confidence values may be accessed directly by a client unit.

In an embodiment the method includes the step of computing the confidence value for each respective block based on at least one of the position of the block with respect to the sub-region, the spatial correlation within the respective block, and the temporal correlation between corresponding blocks of different images of the same video sequence, to provide a set of confidence values.

This feature allows the content of the images to be taken into account during the estimation of the confidence values. As a consequence the confidence values are more representative of the content of the video sequences.

In one embodiment the invention comprises the steps of comparing the confidence value of a respective block with a predetermined threshold and determining, based on the comparison, whether or not the respective block is to be included in the confidence region.

There is therefore a fine adjustment of the confidence region.

In another embodiment the method includes the step of comparing the size of the determined confidence region with the size of an image of the first or second video sequence, and changing the predetermined threshold in dependence upon the comparison, to increase or decrease the number of blocks to be included in the confidence region.

This feature provides enhanced flexibility and enables, for example, the confidence criterion to be relaxed when the sub-region represents only a small part of the full video.

In an embodiment, at least one transition image is displayed during transitioning between the first video sequence and the second video sequence for a time duration dependent on the time for receiving a predetermined number of images of the second video sequence.

Again, by virtue of this feature, the display is not stopped nor frozen during the transition between the first and the second video sequence.

According to a second aspect of the invention there is provided a device for transitioning between an image of a first video sequence and an image of a second video sequence, wherein images of the one of the video sequences correspond to at least one sub-region of a respective images of the other video sequence, the device comprising means for receiving at least one image from the first video sequence; means for providing, from the at least one image, at least one pre-transition image; means for determining, for each at least one pre-transition image, a confidence region within the at least one pre-transition image based on a set of confidence values, each confidence value representing, for a respective block of the at least one pre-transition image, the level of reliability of determining one or more blocks of a corresponding image in the second video sequence from the respective block; means for computing a transition image corresponding to the second video sequence, the transition image being a function of the determined confidence region of the pre-transition image; and a display for displaying the transition image.

The confidence region provides more reliable data for display while performing the transition between two video sequences leading to a smoother visual transition between the video sequences.

In an embodiment, an image of the second video sequence corresponds to a sub-region of a respective image of the first video sequence, and wherein for a transition from the first video sequence to the second video sequence, the at least one pre-transition image provided is the last received image of the first video sequence.

By virtue of this feature, the display is not stopped nor frozen during the transition between the first and the second video sequence.

In an embodiment, the means for computing the transition image is configured to progressively up-sample pixels of the sub-region for a transition from the first video sequence to the second video sequence.

This feature allows a smoother transition when zooming in from a sub-region of a video to the full video.

In an embodiment, an image of the first video sequence corresponds to a sub-region of a respective image of the second video sequence, and wherein for a transition from the first video sequence to the second video sequence, the means for providing the at least one pre-transition image is configured to:

provide an image having a size based on the size of an image of the second video sequence;

generate a zone of pixels corresponding to the sub-region of the second video sequence by down sampling the pixels of a received image of the first video sequence, based on the size of the sub-region; and add the zone of generated pixels to a region of the said provided image corresponding to the sub-region in the respective image of the second video sequence.

As a consequence, at least the sub-region of the respective image of the second video sequence contains recent video data.

In an embodiment, the means for computing the transition image comprises the step of progressively down-sampling pixels of an image of the first video sequence to provide the transition image corresponding to the sub-region.

As a consequence, at least the sub-region of the respective image of the second video sequence contains recent video data.

In an embodiment, the provided image is a previously received image of the first video sequence.

In an embodiment, the provided image is a pre-transition image previously provided.

Using pre-transition images allows a smoother transition to be obtained than when using a previously received image, which could have been received well before the current transition.

In an embodiment, the device is configured to receive parameters defining the or each sub-region within images of the first video sequence in metadata in the form of a coded XML representation.

Using the XML language allows a standard language to be used.

In an embodiment, a respective set of confidence values is defined for each sub-region, each sub-region having an associated second or further video sequence.

In an embodiment, the set of confidence values is received in the form of metadata.

In an embodiment the device includes means for computing the confidence value for each respective block based on at least one of the position of the block with respect to the sub-region, the spatial correlation within the respective block, and the temporal correlation between corresponding blocks of different images of the same video sequence, to provide a set of confidence values. As a consequence, confidence values may be calculated directly by a client unit. Moreover, the content of the images may be taken into account during the estimation of the confidence values. As a consequence the confidence values are more representative of the content of the video sequences.

In an embodiment, means are provided for comparing the confidence value of a respective block with a predetermined threshold and determining, based on the comparison, whether or not the respective block is to be included in the confidence region.

There is therefore a fine adjustment of the confidence region.

In an embodiment, the means for comparing is configured to compare the size of the determined confidence region with the size of an image of the first or second video sequence, and to change the predetermined threshold in dependence upon the comparison, to increase or decrease the number of blocks to be included in the confidence region.

This feature provides enhanced flexibility and enables, for example, the confidence criterion to be relaxed when the sub-region represents only a small part of the full video.

In an embodiment, the display is configured to display at least one transition image during transitioning between the first video sequence and the second video sequence for a time duration dependent on the time for receiving a predetermined number of images of the second video sequence.

Again, by virtue of this feature, the display is not stopped nor frozen during the transition between the first and the second video sequence.

According to a further aspect of the invention, there is provided a method of transmitting at least one video sequence, the method comprising: providing a first video sequence and a second video sequence, wherein an image of the one of the video sequences corresponds to at least one sub-region of a respective image of the other video sequence; providing a set of confidence values, each confidence value representing the level of reliability of determining one or more blocks of an image in the second video sequence from a respective one or more blocks of an image of the first video sequence; transmitting the first video sequence and the set of confidence values to a terminal; and transmitting the second video sequence to the terminal in response to a predetermined event.

The provision of confidence values allows a receiver to perform a more efficient transition between the first and second video sequence.

In an embodiment the method includes coding parameters defining the or each sub-region within images of the first video sequence with an XML representation. The use of XML allows standard techniques to be applied.

In an embodiment, a respective set of confidence values is provided for each sub-region, each sub-region having an associated second or further video sequence. These confidence values enable areas of sub-regions to be classified based on their capability to provide valuable information enabling a client device to perform the transition between two sequences.

In an embodiment, the set of confidence values is transmitted in the form of metadata. Thus a client device can have direct access to the confidence values.

In an embodiment, the method includes the step of computing the confidence value for the respective block based on at least one of the position of the block with respect to the sub-region, the spatial correlation within the respective block, and the temporal correlation between corresponding blocks of different images. This feature enables the content of the images to be taken into account during estimation of the confidence values.

In an embodiment, the method includes the step of comparing the confidence value of a respective block with a predetermined threshold to determine if the respective block is to be included in the confidence region. There is therefore a fine adjustment of the confidence region.

In an embodiment the method includes the step of comparing the size of the determined confidence region with the size of an image of the first or second video sequence, and changing the predetermined threshold in dependence upon the comparison to increase or decrease the number of blocks included in the confidence region. This provides enhanced flexibility enabling for example the confidence criterion to be relaxed when the sub-region represents only a small part of the full video.

According to a further aspect of the invention there is provided a device for transmitting at least one video sequence, the device comprising:

means for providing a first video sequence and a second video sequence, wherein an image of the one of the video sequences corresponds to at least one sub-region of a respective image of the other video sequence;

means for providing a set of confidence values, each confidence value representing the level of reliability of determining one or more blocks of an image in the second video sequence from a respective one or more blocks of an image of the first video sequence;

means for transmitting the first video sequence and the set of confidence values to a terminal; and means for transmitting the second video sequence to the terminal in response to a predetermined event.

In an embodiment the device comprises coding means for coding parameters defining the or each sub-region within images of the first video sequence with an XML representation.

In an embodiment, the means for providing a set of confidence values is configured to provide a respective set of confidence values is provided for each sub-region, each sub-region having an associated second or further video sequence.

In an embodiment, the set of confidence values is transmitted in the form of metadata.

In an embodiment, the device includes means for computing the confidence value for the respective block based on at least one of the position of the block with respect to the sub-region, the spatial correlation within the respective block, and the temporal correlation between corresponding blocks of different images.

In an embodiment, the device includes comparison means for comparing the confidence value of a respective block with a predetermined threshold to determine if the respective block is to be included in the confidence region.

In an embodiment, the comparison means are configured to compare the size of the determined confidence region with the size of an image of the first or second video sequence, and changing the predetermined threshold in dependence upon the comparison to increase or decrease the number of blocks included in the confidence region.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
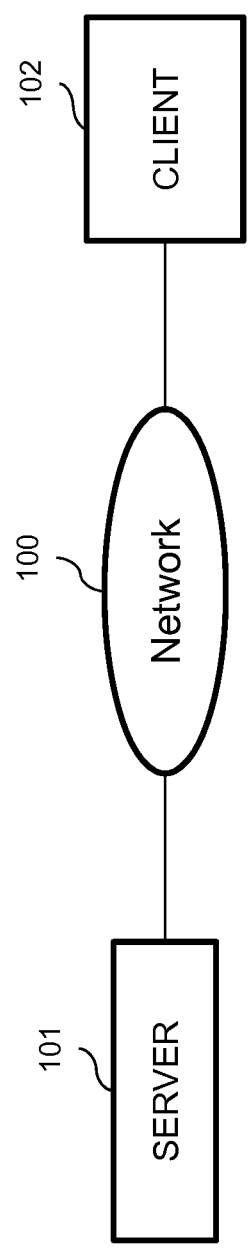
FIG. 1 is a schematic diagram of a data communication network in which one or more embodiments of the invention may be implemented.

FIG. 1 illustrates a data communication system in which one or more embodiments of the invention may be implemented. The data communication system comprises a sending device or server 101 configured to data packets of a data stream to a receiving device or client 102 via a data communication network 100. The data communication network 100 may be wide area network (WAN—Wide Area Network) or a local area network (LAN—Local Area Network); the network in some embodiments of the invention may be a wireless network such as a Wifi/802.11a or b or g network, an Ethernet network, an Internet network or a mixed network composed of several different networks. The system can also be a digital television broadcast system. In this case the server sends the same data to many clients.

The data stream provided by the server 101 is composed of multimedia data representing video and audio information. The audio and video data streams may be captured by the server 101 using a camera and a microphone, stored on the server or received by the server from another device. The video and audio data streams are coded (in particular for them to be compressed) by the server 101. In order to obtain a better ratio of data quality to quantity of data sent, the compression of the video data may be of a motion compensation type, for example in accordance with the H264 format or MPEG2 format.

The compressed data is divided into data packets and transmitted to the client 102 by the network 100 using a communication protocol, for example RTP (Real-time Transport Protocol), UDP (User Datagram Protocol) or any other type of communication protocol.

The client 102 decodes the data stream received by the network 100 and reproduces video images on a display device and audio data by means of an audio device such as a loud speaker. The user at the client side may be provided with a pointing device such as a mouse enabling an ROI in the video sequence to be selected and to switch between images of different resolutions. In some embodiments the client may be provided with a touch sensitive screen and the ROIs may be selected by contacting the ROI on screen, and switching between video sequences of different resolutions may also be achieved by screen contact manoeuvres.

Figure 2:
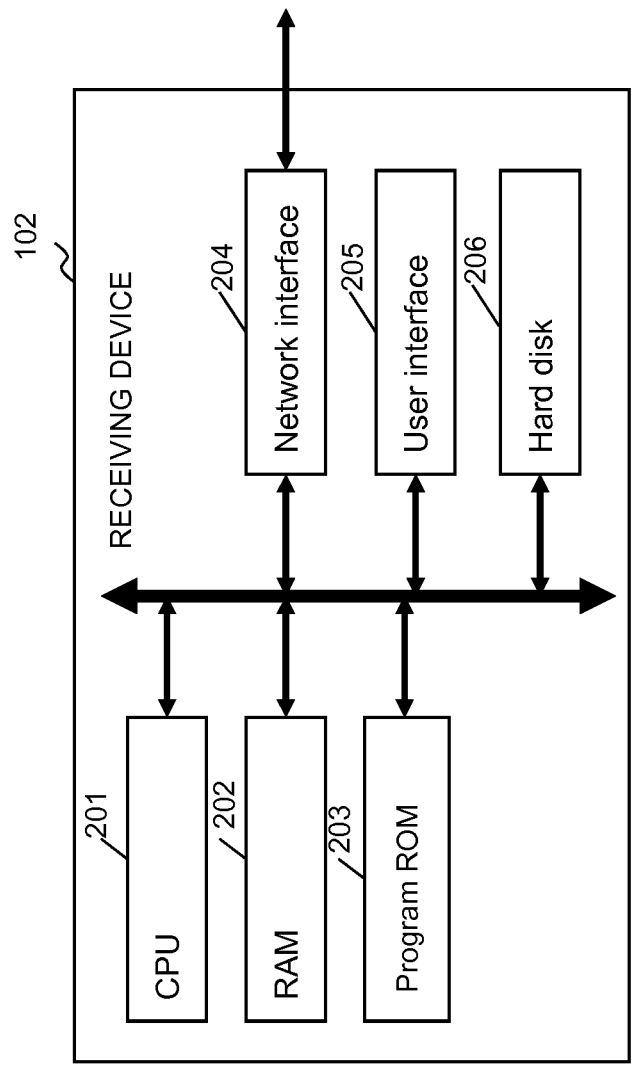
FIG. 2 is a schematic block diagram of a data communication device according to at least one embodiment of the invention.

FIG. 2 illustrates a block diagram of a client device 102 (or server device 101) operable to implement one or more embodiments invention.

Preferably, the device comprises a central processing unit (CPU) 201 configured to execute instructions from program ROM 203 on powering up of the device, and to execute instructions of a software application from main memory 202 after the powering up. The main memory 202 may for example be of Random Access Memory (RAM) type which operates as a working area of CPU 201. The memory capacity of main memory 202 may in some embodiments be expanded by an optional RAM type memory connected to an expansion port (not illustrated). Instructions relating to the software application may be loaded into the main memory 202 from a hard-disc (HD) 206 or from the program ROM 203 for example. A software application, when executed by the CPU 201, enables steps of methods of embodiments of the invention to be performed on the client or server device.

The device further comprises a network interface 204 that enables the connection of the device to the communication network. The software application when executed by the CPU can be adapted to receive data streams through the network interface from other devices, and/or to transmit data streams to other device. A user interface 250 is provided to display information to, and/or to receive inputs from, a user.

Figure 3:
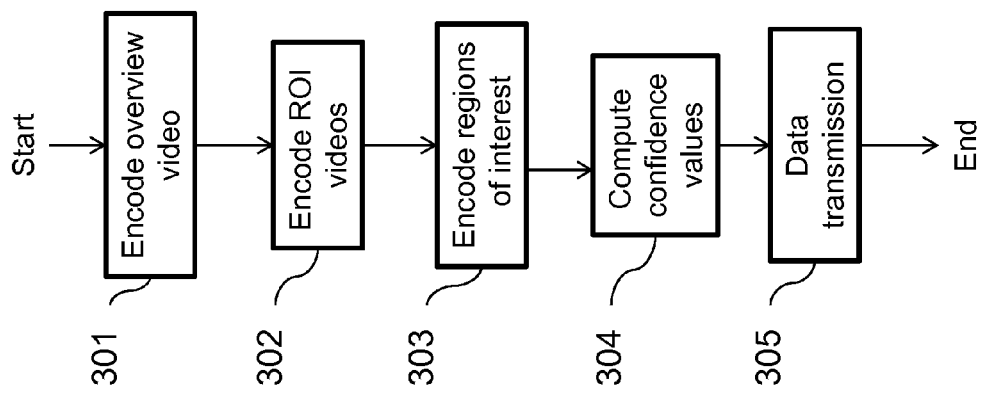
FIG. 3 is a flow chart illustrating steps of a method for encoding transmitting video sequences according to an embodiment of the invention.

FIG. 3 is a flow chart illustrating the steps of a method executed by the server device 101 according to one or more embodiments of the invention for the generation of compressed video streams and associated metadata. As an illustrative example, two types of correlated video sequences may be considered: a first video sequence referred to as overview video sequence corresponds to an overall view of a recorded scene and one or more additional video sequences correspond to regions of interest taken from the overall view. One or more regions of interest are identified within the first video sequence and one or more respective additional video sequences are associated with the one or more identified regions of interest. The additional video sequences are referred as ROI video sequences and represent subparts of the overview video sequence at a higher resolution.

Modules for executing the steps of the process may be implemented in the form of software or hardware, each module being adapted to implement, for example in the form of programming instructions to be executed by the CPU 211 of device 200, at least one corresponding step of the method for transmitting video data according to one or more embodiments of the invention.

The method implemented at server 101 starts by the coding of the overview video sequence in step 301. In one particular embodiment, the video sequence is compressed by applying a block based compression algorithm such as H.264/AVC in order to reduce the size of data to be sent. It will be appreciated however that the invention is not limited to H.264/AVC type compression processing and any other video codec format could be employed. Next, a set of ROI video sequences are also encoded with H.264/AVC during step S302. One or more regions of interest of the overall video sequence may be defined during this step by the administrator of the video database, or be automatically defined with the help of a region segmentation algorithm configured to determine certain objects in the overall view, for example moving objects, in the overview video frames.

Once regions of interest of the overview video sequence have been determined, the server encodes their parameters in step 303 for later transmission to the client. In a preferred embodiment, the regions of interest are coded with an XML representation. Another alternative is to use a binary XML representation for coding the regions of interest. The advantage of the XML representation resides in the fact that XML tree can be easily handled by web browsers which provide numerous technologies to process such data. Regions of interest parameters may include one or more of the following parameters:

Shape of the ROI
Coordinates of the ROI in the overview video sequence
Size of the ROI
List of links to corresponding ROI videos Each region of interest of the overall video sequence is also associated with at least one of the ROI video sequences that have been coded during step 302. This parameter is used by the client to link the region of interest with one ROI video sequence and to allow the retrieval of that ROI video sequence when the user interacts with the ROI on the overview video sequence. Additional parameters related to the ROI video sequence may also be added to metadata such as the height and width of the video sequence as well as the start and end time of the ROI in the overview video sequence's referential time frame.

In step 304 the server device 101 computes confidence maps comprising a set of confidence values associated with blocks of the video frame. Several confidence maps may be computed to cover all the possible transitions. In one embodiment of the invention, the confidence map is computed in parallel with the transmission of the video sequences. The advantage of computing the confidence map in parallel with video sequence transmission is that the server avoids the need to store all necessary confidence maps in memory. In a particular embodiment, the confidence maps are all computed prior to the transmission during an initialisation phase of the video provider server. In the following illustrative embodiments, it is assumed that the server handles the overview video and only one ROI video sequence. If the number of ROI video sequences is greater than one, a confidence map should be computed for each ROI video sequence. One confidence map is generated to handle the transition from the overview video sequence to the ROI video sequence and a second confidence map is generated for the inverse transition from the ROI video sequence to the overall video sequence. Several confidence maps are regularly transmitted for each region of interest. In a preferred embodiment, one confidence map is sent for each frame of the overview video. This advantageously enables the reliability of each predicted pre-transition to be estimated. In another embodiment, confidence maps are transmitted every N frames (N>1) to save bandwidth.

It may be firstly considered for exemplary purposes that the server transmits the ROI video and awaits a switch request to switch to the overview video sequence. The confidence map computed by the server should represent the reliability level that may be associated with a prediction of the overview video frame performed by the decoder on client side. The server analyses the content of the overview video to identify if it meets a set of favourable characteristics. The overview video frame is subdivided into blocks of a predetermined size. In a particular embodiment, the blocks of the confidence map match the blocks used for the compression of the overview video sequence. In other embodiments smaller or even wider blocks may be used. The confidence map is constituted of a set of confidence values attributed to each block of the overview video frame. The confidence value corresponds to a weighted sum of three components as set out in equation 1:

$$C(m, n, t) = \alpha C_{spat}(m, n) + \beta C_{temp}(m, n, t) + \gamma C_{roi}(m, n, t) \quad \text{(Eq.1)}$$

where:
(m, n) are the coordinates of the current block in the overview video frame and t represents the current frame index,
$C_{spat}(m, n)$ is a value depending on spatial properties of the block,
$C_{temp}(m, n)$ is a value depending on temporal correlation between frames,
$C_{ROI}(m, n, t)$ depends on the position of the block with respect to the ROI, and
$\alpha, \beta, \gamma$ are scaling factors.

A null confidence value indicates that the block is very difficult to predict and a relatively high value specifies that the block is simple to predict. These three components are calculated for each frame of the overview video sequence.

In order to estimate the spatial characteristics of a block, the variance of pixels is employed that is null for a homogeneous block and high when the block contains high frequencies (i.e. is highly detailed). The spatial component of the confidence value is equal to the inverse of the variance in order to obtain a null value for a high frequency block (thus difficult to predict) and an infinite value when the block is homogeneous (easier to predict). In equation 2 the VAR function is the variance and $B_{m,n}$ is the block of pixels located at coordinates (m,n).

$$C_{spat}(m, n) = \frac{1}{VAR(B_{m,n})} \quad \text{(Eq. 2)}$$

The temporal component of the confidence value is computed in accordance with equation 3

$$C_{temp}(m, n, t) = \quad \text{(Eq. 3)}$$
$$\begin{cases} \infty, & \text{if } SAD(B_{m,n}(IDR_j), B_{m,n}(IDR_{j+1})) = 0 \\ \frac{1}{SAD(B_{m,n}(IDR_j), B_{m,n}(IDR_{j+1}))}, & \text{otherwise} \end{cases}$$

where:

SAD(x,y) represents the Sum of Absolute Difference between the two blocks x and y;

$B_{m,n}(Z)$ is the block of pixels located at coordinates (m,n) in the overview video frame corresponding to time Z.

$IDR_j$ is the $j^{th}$ IDR frame of the video sequence. In H.264/AVC, an IDR (Instantaneous Decoding Refresh) frame is a special frame that permits resetting of the decoding process and is generally used as a resynchronization point. IDR frames are regularly employed typically every 500 ms or 16 frames. The temporal component of the confidence value is equal to the inverse of the SAD between two collocated blocks in two IDR pictures and reflects the block evolution within a group of pictures. The blocks are identical when the SAD is null and in this case the temporal component is infinite. SAD is high when the two blocks are very different leading to a temporal component converging on zero. In an alternative embodiment, the temporal component may use the motion information determined during the coding of the video sequence to estimate if the block motion in the frames will be difficult to predict on the client side.

The last component of the confidence value depends on the ROI localisation within the predicted frame. Since the ROI video frame could be employed to predict the pixels of the overview video frame, the blocks localised in the ROI are easily estimated. Thus, the idea is to attribute a high confidence value for blocks localised within the ROI and to decrease progressively their value when they exit the bounds of the ROI bounds. Equation 4 is used to calculate the ROI component of the confidence value where K is a predetermined number.

$$C_{roi}(m, n, t) = \begin{cases} K, \text{ if } B_{m,n} \in ROI \\ C_{roi}(m, n, t-1) - 1 \end{cases} \quad \text{(Eq. 4)}$$

The scaling factors α, β and γ are used to weight the importance of the three components in the confidence value. In the preferred embodiment, an equal repartition is used so the scaling factors are all equal to ⅓.

The generation of a confidence map for the transition from the overview video sequence to the ROI video according to an embodiment of the invention will now be considered. The same formulae as for the inverse transition may still be applied. In this case the current frame refers to a frame from the ROI video sequence and the "ROI" in the formulae of equations 1 to 4 refers now to the overview video sequence. One difference is that the ROI component of the confidence is always equal to K since all pixels of the ROI video are available in the overview video sequence. Moreover, the ROI video frame can be predicted by up-sampling the pixels of received overview video frames. The prediction of the decoder is also efficient when the blocks to up-sample are homogeneous. However it is less precise when the blocks contain high frequencies, thus showing the importance of the α factor. Significant changes from one ROI video frame to another have no impact on the prediction performed by the decoder. Therefore, the scaling factors α and γ are set to ½ and β is set to 0 to neglect the temporal component in the confidence value.

The last stage 305 of the server processing comprises the transmission of one video sequence with associated metadata, defining the regions of interest, in XML and the confidence map. The video sequence being transmitted depends on the client requests: for instance, at the beginning of the streaming, the overview video sequence is transmitted. While browsing the overview video, the player can highlight a region of interest on the overview video sequence. If the user interacts with a region of interest, the associated ROI video sequence is requested and so the server selects the corresponding ROI video sequence from the set of ROI video sequences. An important point of this embodiment of the invention is that region of interest parameters coded in an XML representation are always transmitted irrespective of the selected video sequence. The XML description of the ROI may be interleaved with the video stream or completely sent at the beginning of the video streaming. The first solution is appropriate when the number of region of interests is high since it allows the client to avoid using a large amount of memory to store the ROI description. The confidence map is systematically sent independently of the video being transmitted. A confidence map is created for each frame of the overview video.

Figure 4:
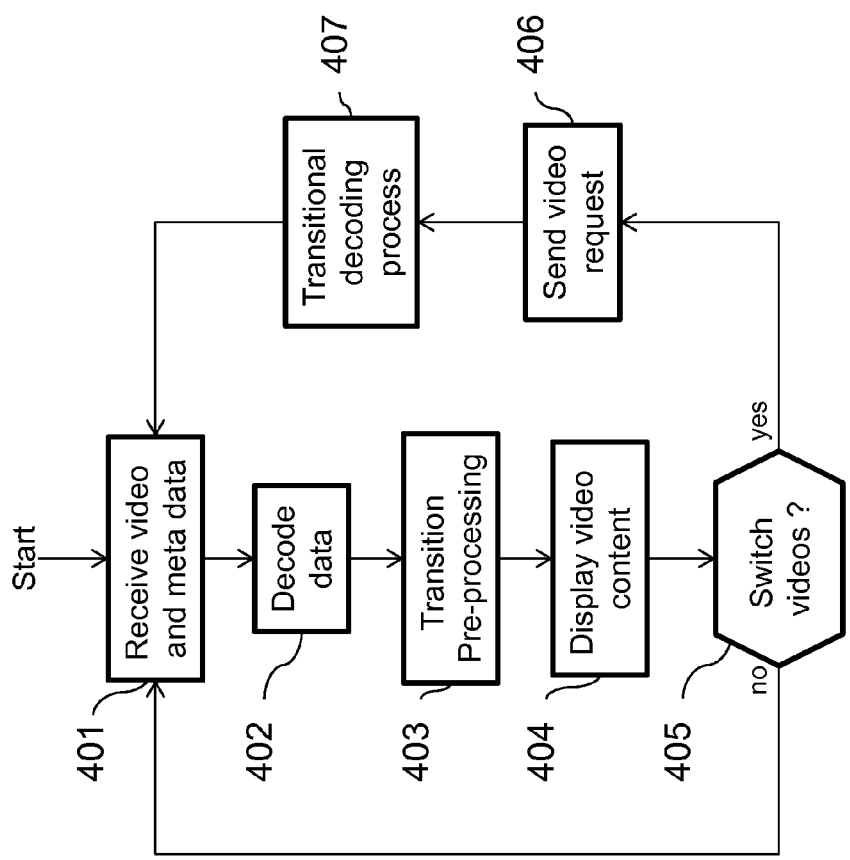
FIG. 4 is a flow chart illustrating steps of a method for receiving and decoding video sequences according to an embodiment of the invention.

FIG. 4 is a flow chart illustrating the steps of a method executed by the client device 102 according to one or more embodiments of the invention for decoding compressed video streams and associated metadata received from the server.

Modules for executing the steps of the process may be implemented in the form of software or hardware, each module being adapted to implement, for example in the form of programming instructions to be executed by the CPU 201 of device 200, at least one corresponding step of the method for transmitting video data according to one or more embodiments of the invention.

In the illustrated flow chart of FIG. 4 two loop branches in the client algorithm may be identified: a first one comprises steps 401 to 405 and corresponds to the main processing loop of the client device for decoding received video data and displaying region of interests. The second branch comprises steps 406 and 407 that are executed when the user interacts with the client devices and requests switching between video sequences. In steps 406 to 407 a request is sent to the server for transmitting a new video sequence and a transition process is implemented until the requested video sequence is received by the client device.

Initially while a user is browsing video data, data of a first video is received at the client device 102 from the server 101 along with metadata during step 401. Metadata includes XML representation of the regions of interest and also the corresponding confidence maps. Depending on the status of the browsing, the first video could be either the overview video sequence or an ROI video sequence. In a further embodiment, the regions of interest are sent once at the beginning of the browsing process, and so only video content needs to be received. Steps 401 to 405 are performed successively on each frame of the received video sequence such that video frames are handled one by one.

The next stage 402 comprises decoding each encoded frame of the received video sequence. The description of the regions of interest and corresponding confidence maps that have been received as metadata are also decoded. The parameters defining the region of interests and the confidence map data are then stored in a memory.

In subsequent step 403 the decoded video frame to be used during the transitional decoding process handled during step 407 is processed. More precisely, step 403 sets out to predict a video frame corresponding to the overview video frame that will be used for performing the transition between the two video sequences. This process will be described in further detail with reference to FIG. 5.

In step 404 the region of interests parameters which have been decoded and extracted in step 402 are employed to display the region of interests superimposed over the video content when the overview video sequence is displayed. This process enables a clickable area to be displayed which can be clicked on to retrieve a zoom version of the selected ROI area. In step 405 it is determined if the user has selected a region of interest. In a first case, the user has not interacted with any region of interest of the displayed video sequence and the process returns to step 401, to process the next frame of the video.

If in step S405 it is determined that the user has selected a region of interest, the client device will switch to the ROI video sequence that is associated with the selected region of interest. The corresponding ROI video sequence is a zoomed version of the selected area in a higher resolution than the resolution of the overview video frame and a transition is employed to switch between the overview video sequence and the ROI video sequence in steps 406 and 407.

In step 406 the client device 102 sends a video a request to the server device 101 according to the status of the browsing by the user. Two cases may be identified:

a first case in which an overview video sequence is being played and the user selects one region of interest of the overview video sequence. The client device uses the decoded ROI description metadata which includes a parameter that references the corresponding ROI video sequence that should be requested. The current playback time is also used to request the appropriate temporal fragment in the ROI video sequence. A temporal fragment corresponds to a time interval of a video sequence that has been extracted from the original video sequence. Several technologies provide a protocol that enable requests to extract a fragment from a video sequence to be defined. In a particular embodiment of the invention the emerging standard being normalized by W3C which is Media Fragment URI 1.0 may be employed, for example. The client device 102 then requests the ROI video sequence using the retrieved URL.

In a second case, a ROI video sequence is being played. The client device 101 retrieves the start time of the regions of interest that are being played. It then calculates the corresponding time in the overview video sequence from the current playback time of the ROI video sequence and the start time of the ROI sequence. A temporal media fragment request is sent to the server device 101 to retrieve the overview video sequence with a start time equal to the time previously calculated.

Once the request for the second video sequence has been sent in step 406, the client device 102 awaits reception of the second video sequence for a time duration due to transmission delay. A transitional decoding process is employed by the client device 102 in step 407 to perform a smooth transition between the first video sequence and the second video sequence while the second video sequence is being received. The description of this process according to an embodiment of the invention will be described with reference to FIG. 6. Then, the main loop of steps 401 to 405 enables the second video sequence to be decoded once it has been received at the client terminal 102.

Figure 5:
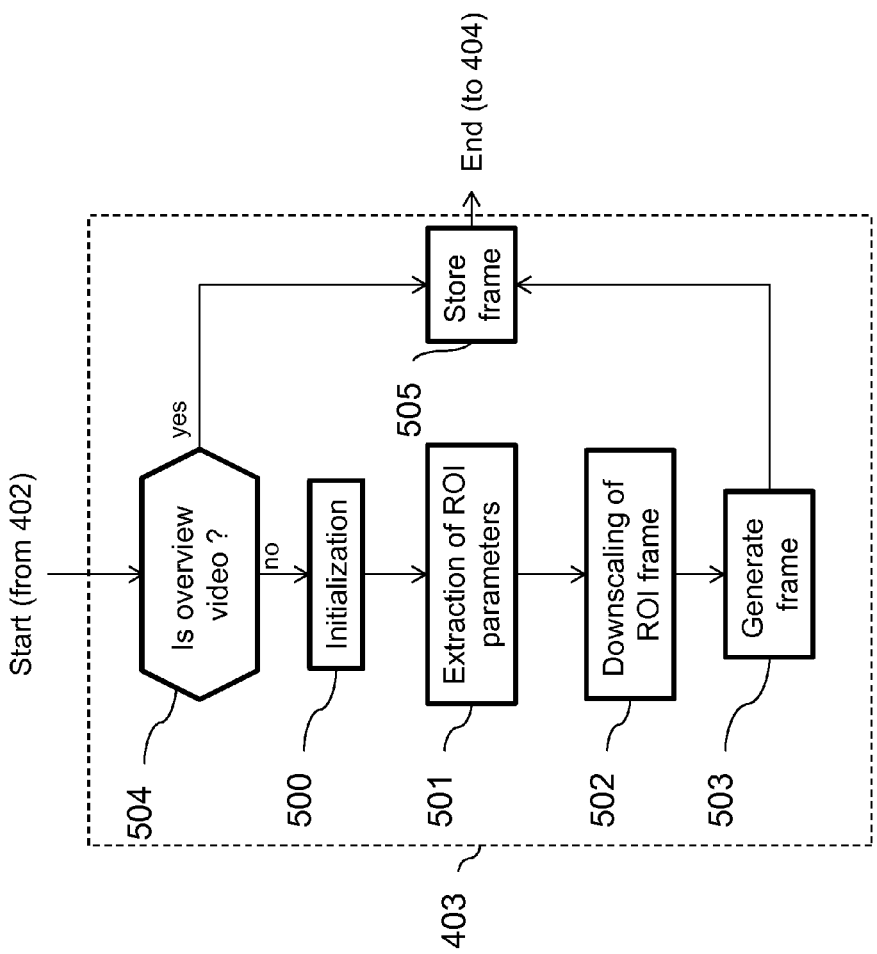
FIG. 5 is a flow chart illustrating steps of a transition pre-processing method according to an embodiment of the invention.

FIG. 5 is a flow chart illustrating pre-processing steps according to an embodiment of the invention performed at the client device 101 during the transition pre-processing step 403 of FIG. 4. In an initial step 504 the client device checks which video sequence is being currently received and played. If the received video sequence is an overview video sequence, the decoded frame is then stored in a memory of the device at step 505 which ends the transition pre-process. The decoded frame can then be used while performing the transitional decoding process of step 407 of FIG. 4.

The pre-process starts at step 500 which corresponds to an initialization step when a ROI video sequence is currently being handled by the client device. On a first execution of this algorithm, the most recently decoded overview video frame stored during step 505 is retrieved at step 500 during decoding the overview video sequence by the client device. If the client device has not received the overview video sequence before, a frame is created having the same size as the overview video sequence and initialized with default values for provision of a pre-transition image to derive a transition image for transitioning from the ROI sequence to the overview sequence. Next metadata corresponding to the selected region of interest is retrieved and the ROI parameters are extracted during step 501. These parameters include the size of the region of interest and also the coordinates of the region of interest within the overview video frame. In step 503 the extracted parameters are employed to predict the overview video frame. Before this last step, the frame of the ROI video sequence is down sampled to match the size of the ROI in the overview video sequence. For example, the size of the ROI video is 1920× 1080 pixels and the size of the ROI in the overview video sequence read from metadata during step 501 is equal to 240×135 pixels, in step 502 the frame of the ROI video is down sampled to obtain a frame of size 240×135 pixels corresponding to the size of the ROI in the overview video sequence. It may be noted that in a preferred embodiment, the ratio between the width and the height of the ROI in the overview sequence is always the same as the ratio between the width and the height of the overview video.

The down-sampled image obtained is pasted into the frame retrieved during initialization step 500 at the position corresponding to the ROI in the overview video frame to provide the pre-transition image and the down-sampled pre-transition image is stored in memory in step 505. For subsequent executions of the algorithm, the prediction process is initialised in step 500 by retrieving the predicted frame (i.e. a previously provided pre-transition image) stored in memory of the client device at the end of the previous execution of the algorithm.

Finally, the pixels of the region of interest in the most recently decoded overview video frame are updated with pixels of the ROI video sequence. The advantage of this method is that when performing the transition (typically a zoom-out) from the ROI video sequence to the overview video sequence, the overview video sequence frame forming the transition image is predicted with pixels that correspond to recently decoded video data. Nevertheless, depending on the content of the video sequence, the predicted frame quality may be poor in a specific area of the predicted image. For this purpose, the client device applies a process that asserts the quality of the predicted frame. A confidence map is employed to determine which area of the predicted frame forming the pre-transition image is sufficiently well predicted. This sufficiently well predicted area is referred to as a confidence region. An embodiment of such a process will now be described in the following section.

Figure 6:
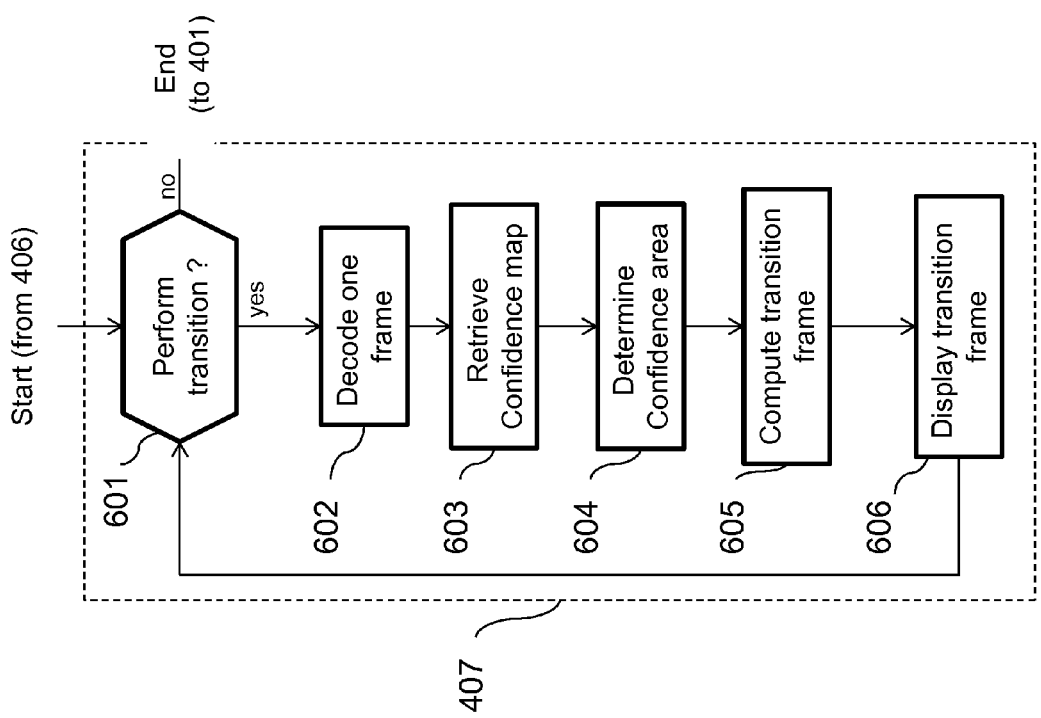
FIG. 6 is a flow chart illustrating steps of a decoding method employed when performing a transition between two video sequences according to an embodiment of the invention.

A transitional decoding process for handling the transition when switching from a first video to a second video will now be described with reference to the flow chart of FIG. 6. For exemplary illustrative purposes a mechanism for a zoom-in/out transition will be described but it will be appreciated that other types of transition may be used without departing from the scope of the invention. As for the main decoding process of the described embodiment of invention, the video sequence is treated on a frame by frame basis. At the beginning of each iteration of the process in step 601 it is firstly determined if a transition from a first video sequence to a second video sequence is finished. The transitional decoding process ends when enough data for the second video has been received or buffered and when the number of processed frames is greater than a predefined number. The predefined number may correspond, for example to the transition processing time in terms of frames as defined by a user and is defined as a function of characteristics of the application. For example, a number of frames corresponding to 2 seconds of video playing time is a suitable value. In one alternative, the predefined number is modified as a function of characteristics of the network. For instance, when a "round trip time" parameter (RTT) increases, the predefined number may be incremented and on the contrary when the RTT decreases, the predefined number can be decremented.

While the transition is not fully completed, a transitional decoding process is performed during the steps 602, 603, 604, 605 and 606 of the processing loop. Firstly, a video frame is decoded that corresponds either to the first or to the second video sequence depending on the received video. In order to specify a reliable area of the predicted frame obtained at the output of step 403 of FIG. 4 a confidence map is retrieved at step 603. In one particular embodiment of the invention, the client device decodes the metadata that has been received in addition to the video sequences. The metadata includes a confidence map previously computed at the server side. In another embodiment of the invention, the confidence map is not computed at the server side but rather at the client side. This alternative provides some advantages as will be further described in a subsequent section. Finally, a value for each block of the confidence map is retrieved and used in the next step of the algorithm to compute the frame that will be displayed to perform the transition.

The predicted frame, forming a pre-transition image, stored in memory during step 403 is used in step 604 along with its corresponding confidence map. Each block of the confidence map is successively compared to a predetermined threshold value. A confidence value below the threshold indicates that the corresponding block in the predicted frame has a high probability of being poorly estimated. On the other hand, a confidence value above the threshold infers that the block is likely to be correctly estimated during step 403 and therefore is supposed to be reliable. The client device then collects a set of consecutive blocks that are considered as being reliable (i.e. with a confidence value above a threshold) and builds a reliable area (also called confidence region in what follows) which corresponds to the subpart of the confidence map with confidence values above the threshold in the predicted frame that ensures that the prediction has a good quality. Depending on the transition type, the area could be extended or reduced to form a rectangular shape that is more adapted to performing the transition. It may be noted that the shape of the confidence region is not limited to a rectangle and that any shape could be obtained.

In another embodiment, the threshold may be adapted in order to obtain a predetermined ratio between the video frame size and reliable area sizes. This may be done by comparing the confidence value with a first threshold value. The ratio between the sizes of the video frame and the reliable area is then compared to the pre-determined expected ratio value. If it is below the expected ratio value then the threshold value is increased to reinforce the reliability criteria. On the contrary, if it is above the expected ratio, the threshold is decreased to collect more blocks in the reliable area.

Figure 7:
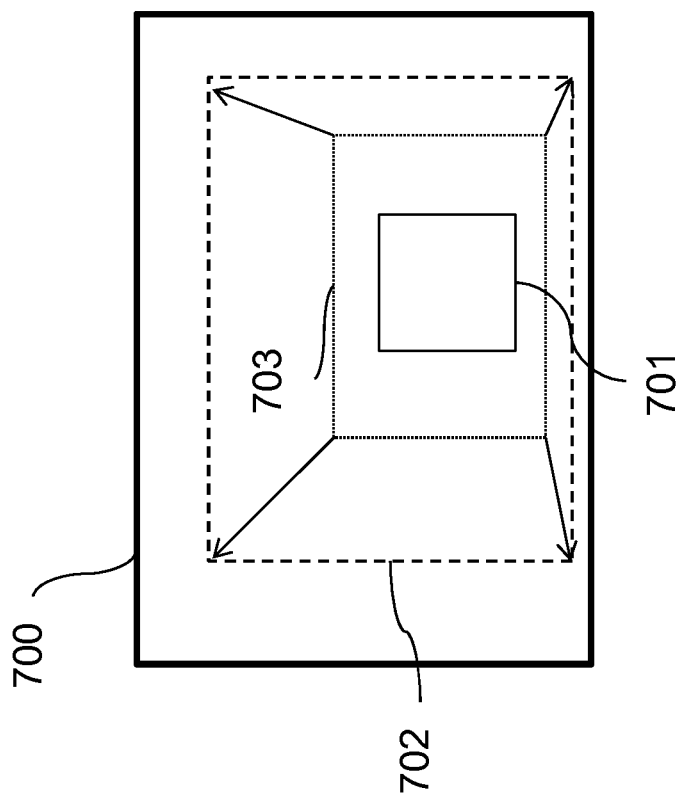
FIG. 7 schematically illustrates the transition between two video sequences according to an embodiment of the invention.

The next step 605 of the transitional decoding process involves performing the transition between the two videos, as will be described with reference to FIG. 7. The principle is to limit the transition to the reliable area determined in step 604. In a particular embodiment of the invention, a zoom transition is performed. Two cases may be considered. In a first case, an overview video sequence is being played and the confidence map indicates which blocks are reliable. The predicted ROI video frame is predicted by up-sampling the pixels corresponding to the selected region of interests. Up-sampling process is very efficient when the up-sampled block is composed of low frequencies i.e. is homogeneous. When the block is very detailed, high frequencies are not perfectly predicted. The spatial component of the confidence value measures this characteristic for each block. The reliable area ensures that the zoom-in can be performed with the most homogeneous block. Consequently, the zoom-in transition is done progressively on a predetermined number of frames by up-sampling the reliable area of overview video frames progressively. In another embodiment, the confidence map is not used specifically for zoom in transition since in most case the up-sampling process is quite efficient.

When switching from a ROI video sequence to the overview video sequence a reliable area 702 (referred to as the confidence region) determined with the help of a confidence map can be very useful. This is because it provides an area of pixels that is asserted as being reliable for performing the transition to the overview video sequence. The zoom-out transition is performed progressively until the overview video sequence is received and for a predetermined number of frames with a viewport 703 delimited by the reliable area. In FIG. 7, a pre-transition image 700 is represented with the reliable area 702 determined in step 604. The rectangle 701 represents the initial viewport within the pre transition image. The viewport corresponds to the area in the pre transition image corresponding to the current frame of ROI video. For subsequent images the viewport 703 is progressively increased at each frame up to the size of the reliable area 702. Since the size of the viewport differs from the size of the overview video frames, pixels of the viewport are interpolated to obtain a transition image equal to the size of frames of the overview video sequence. The resulting frame forming the transition image is then displayed in step 606. In another embodiment, pixels of the ROI frame can be directly downsampled in the transition image to avoid successive down-sampling (to generate pre-transition image) and upsampling (to scale viewport image to the size of overview frame) of ROI frame when performing transitional decoding process (407).

In a further embodiment of the invention, a confidence map is computed at the client side. The advantage of such an embodiment is that the server complexity is reduced since it has less computation to perform. Moreover the server does not need to apply step 304 of FIG. 3. On client side, the stage 603 consists in computing the confidence map. The confidence map is computed with a principle very similar to 304. The main change is that the temporal and spatial components cannot be computed since the pixels of the second video are not available. A first solution is to set $\alpha$ and $\beta$ factors to zero and $\gamma$ to 1. To obtain a more accurate confidence value, a second solution comprises computing the temporal component with the last two IDR pictures previously received and the spatial component with the last decoded picture. Since these pictures may be very old the accuracy of these two components may be low. Thus, the $\alpha$ and $\beta$ factors of Eq. 1 are set to $\frac{1}{8}$ and $\gamma$ to $\frac{3}{4}$ in order to favour the third component.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of transitioning between an image of a first video sequence and an image of a second video sequence, wherein images of the one of the video sequences correspond to at least one sub-region of respective images of the other video sequence, the method comprising
receiving at least one image of the first video sequence;
providing, from the at least one image, at least one pre-transition image;
for each at least one pre-transition image:
determining a confidence region within the at least one pre-transition image based on a set of confidence values, each confidence value representing, for a respective block of the at least one pre-transition image, the level of reliability of determining one or more blocks of a corresponding image in the second video sequence from the respective block;
computing a transition image corresponding to the second video sequence, the transition image being a function of the determined confidence region of the pre-transition image; and
displaying the transition image.

2. A method according to claim 1, wherein an image of the second video sequence corresponds to a sub-region of a respective image of the first video sequence, and wherein for a transition from the first video sequence to the second video sequence, the at least one pre-transition image provided is the last received image of the first video sequence.

3. A method according to claim 2, wherein for a transition from the first video sequence to the second video sequence, computing the transition image comprises a step of progressively up-sampling pixels of the sub-region.

4. A method according to claim 1, wherein an image of the first video sequence corresponds to a sub-region of a respective image of the second video sequence, and wherein for a transition from the first video sequence to the second video sequence, providing the at least one pre-transition image comprises the steps of:
providing an image having a size based on the size of an image of the second video sequence;
generating a zone of pixels corresponding to the sub-region of the second video sequence by down sampling the pixels of a received image of the first video sequence, based on the size of the sub-region; and
adding the zone of generated pixels to a region of the said provided image corresponding to the sub-region in one image of the second video sequence previously decoded.

5. A method according to claim 4 wherein computing the transition image comprises the step of progressively down-sampling pixels of an image of the first video sequence to provide transition images corresponding to the sub-region.

6. A method according to claim 4 wherein the provided image is a previously received image of the first video sequence.

7. A method according to claim 4 wherein the provided image is a pre-transition image previously provided.

8. A method according to claim 1 wherein parameters defining the or each sub-region within images of the first video sequence are received in metadata in the form of a coded XML representation.

9. A method according to claim 1 wherein a respective set of confidence values is defined for each sub-region, each sub-region having an associated second or further video sequence.

10. A method according to claim 1, wherein the set of confidence values is received in the form of metadata.

11. A method according to claim 1 comprising the step of computing, based on received video data, the confidence value for each respective block.

12. A method according to claim 11 wherein each confidence value is based on at least one of the position of the respective block with respect to the sub-region, the spatial correlation within the respective block, and the temporal correlation between corresponding blocks of different images of the same video sequence, to provide the set of confidence values.

13. A method according to claim 1 further comprising the steps of comparing the confidence value of a respective block with a predetermined threshold and determining, based on the comparison, whether or not the respective block is to be included in the confidence region.

14. A method according to claim 13 further comprising the step of comparing the size of the determined confidence region with the size of an image of the first or second video sequence, and changing the predetermined threshold in dependence upon the comparison, to increase or decrease the number of blocks to be included in the confidence region.

15. A method according to claim 1 wherein at least one transition image is displayed during transitioning between the first video sequence and the second video sequence for a time duration dependent on the time for receiving a predetermined number of images of the second video sequence.

16. A non-transitory computer-readable storage medium storing instructions of a computer program for implementing a method, according to claim 1.

17. A device for transitioning between an image of a first video sequence and an image of a second video sequence, wherein images of the one of the video sequences correspond to at least one sub-region of a respective images of the other video sequence, the device comprising
- a receiver for receiving at least one image from the first video sequence;
- an image processor for providing, from the at least one image, at least one pre-transition image;
- a confidence region detector for determining, for each at least one pre-transition image, a confidence region within the at least one pre-transition image based on a set of confidence values, each confidence value representing, for a respective block of the at least one pre-transition image, the level of reliability of determining one or more blocks of a corresponding image in the second video sequence from the respective block;
- a transition image processor for computing a transition image corresponding to the second video sequence, the transition image being a function of the determined confidence region of the pre-transition image; and
- a display for displaying the transition image.

18. A device according to claim 17, wherein an image of the second video sequence corresponds to a sub-region of a respective image of the first video sequence, and wherein for a transition from the first video sequence to the second video sequence, the at least one pre-transition image provided is the last received image of the first video sequence.

19. A device according to claim 18, wherein the transition image processor is configured to progressively up-sample pixels of the sub-region for a transition from the first video sequence to the second video sequence.

20. A device according to claim 17, wherein an image of the first video sequence corresponds to a sub-region of a respective image of the second video sequence, and wherein for a transition from the first video sequence to the second video sequence, the image processor is configured to:
- provide an image having a size based on the size of an image of the second video sequence;
- generate a zone of pixels corresponding to the sub-region of the second video sequence by down sampling the pixels of a received image of the first video sequence, based on the size of the sub-region; and
- add the zone of generated pixels to a region of the said provided image corresponding to the sub-region in the respective image of the second video sequence.

21. A device according to claim 20, wherein the transition image processor is configured to progressively down-sample pixels of an image of the first video sequence to provide transition images corresponding to the sub-region.

22. A device according to claim 20 wherein the provided image is a previously received image of the first video sequence.

23. A device according to claim 20 wherein the provided image is a pre-transition image previously provided.

24. A device according to claim 17 configured to receive parameters defining the or each sub-region within images of the first video sequence in metadata in the form of a coded XML representation.

25. A device according to claim 17 wherein a respective set of confidence values is defined for each sub-region, each sub-region having an associated second or further video sequence.

26. A device according to claim 17, wherein the set of confidence values is received in the form of metadata.

27. A device according to claim 17 comprising a confidence value processor for computing, based on received data, the confidence value for each respective block.

28. A device according to claim 27 wherein the confidence value processor is configured to compute each confidence value based on at least one of the position of the block with respect to the sub-region, the spatial correlation within the respective block, and the temporal correlation between corresponding blocks of different images of the same video sequence, to provide the set of confidence values.

29. A device according to claim 17 further comprising a comparator for comparing the confidence value of a respective block with a predetermined threshold and determining, based on the comparison, whether or not the respective block is to be included in the confidence region.

30. A device according to claim 29 wherein the comparator is configured to compare the size of the determined confidence region with the size of an image of the first or second video sequence, and to change the predetermined threshold in dependence upon the comparison, to increase or decrease the number of blocks to be included in the confidence region.

31. A device according to claim 17 wherein the display is configured to display at least one transition image during transitioning between the first video sequence and the second video sequence for a time duration dependent on the time for receiving a predetermined number of images of the second video sequence.

32. A method of transmitting at least one video sequence, the method comprising, at a server end:
- providing a first video sequence and a second video sequence, wherein an image of the one of the video sequences corresponds to at least one sub-region of a respective image of the other video sequence;
- providing a set of confidence values, each confidence value representing the level of reliability of determining one or more blocks of an image in the second video sequence from a respective one or more blocks of an image of the first video sequence;
- transmitting, to a client device, the first video sequence;
- transmitting, to a client device, the set of confidence values for the client device to compute a transition image to be displayed during transitioning between the first video sequence and the second video sequence before the client device receives a predetermined number of images of the second video sequence; and
- transmitting the second video sequence to the client device in response to a predetermined event.

33. A method according to claim 32 comprising coding parameters defining the or each sub-region within images of the first video sequence with an XML representation.

34. A method according to claim 32, wherein a respective set of confidence values is provided for each sub-region, each sub-region having an associated second or further video sequence.

35. A method according to claim 32, wherein the set of confidence values is transmitted in the form of metadata.

36. A method according to claim 32 comprising the step of computing the confidence value for a respective block based on at least one of the position of the block with respect to the sub-region, the spatial correlation within the respective block, and the temporal correlation between corresponding blocks of different images.

37. A method according to claim 32, wherein the confidence value of a respective block is used to be compared with a predetermined threshold to determine if the respective block is to be included in a confidence region providing reliable data to be displayed during transitioning between the first video sequence and the second video sequence.

38. A method according to claim 37, wherein the size of the determined confidence region is compared with the size of an image of the first or second video sequence to generate a ratio which is used to be compared with a predetermined threshold so as to adjust the predetermined threshold and to increase or decrease the number of blocks included in the confidence region.

39. A device for transmitting at least one video sequence, the device being at a server end and comprising: an image processor for providing a first video sequence and a second video sequence, wherein an image of the one of the video sequences corresponds to at least one sub-region of a respective image of the other video sequence; a processor for providing a set of confidence values, each confidence value representing the level of reliability of determining one or more blocks of an image in the second video sequence from a respective one or more blocks of an image of the first video sequence; a transmitter for transmitting the first video sequence and the set of confidence values to a terminal; and transmitting the second video sequence to the terminal in response to a predetermined event.

40. A device according to claim 39 comprising an encoder for coding parameters defining the or each sub-region within images of the first video sequence with an XML representation.

41. A device according to claim 39, wherein the processor for providing a set of confidence values is configured to provide a respective set of confidence values is provided for each sub-region, each sub-region having an associated second or further video sequence.

42. A device according to claim 39, wherein the set of confidence values is transmitted in the form of metadata.

43. A device according to claim 39 comprising a processor for computing the confidence value for the respective block based on at least one of the position of the block with respect to the sub-region, the spatial correlation within the respective block, and the temporal correlation between corresponding blocks of different images.

44. A device according to claim 39, wherein the confidence value of a respective block is compared with a predetermined threshold in order to determine if the respective block is to be included in a confidence region providing reliable data to be displayed during transitioning between the first video sequence and the second video sequence.

45. A device according to claim 44, wherein the size of the determined confidence region is compared with the size of an image of the first or second video sequence to generate a ratio which is used to be compared with a predetermined threshold so as to adjust the predetermined threshold and to increase or decrease the number of blocks included in the confidence region.

* * * * *